US010157070B2

(12) United States Patent
Barash et al.

(10) Patent No.: US 10,157,070 B2
(45) Date of Patent: Dec. 18, 2018

(54) DOCUMENT PREPARATION PLATFORM

(71) Applicant: Story2, LLC, New York, NY (US)

(72) Inventors: Carol Barash, South Orange, NJ (US); John Scotti, Long Island City, NY (US); Moshiur Tarafdar, Bellerose, NY (US)

(73) Assignee: STORY2, LLC, New York, NY (US)

( * ) Notice: Subject to any disclaimer, the term of this patent is extended or adjusted under 35 U.S.C. 154(b) by 0 days.

(21) Appl. No.: 15/208,167

(22) Filed: Jul. 12, 2016

(65) Prior Publication Data

US 2017/0017630 A1  Jan. 19, 2017

Related U.S. Application Data

(60) Provisional application No. 62/192,376, filed on Jul. 14, 2015.

(51) Int. Cl.
| | |
|---|---|
| *G06F 17/00* | (2006.01) |
| *G06F 9/451* | (2018.01) |
| *G06F 9/44* | (2018.01) |
| *G06F 17/28* | (2006.01) |
| *G06F 17/24* | (2006.01) |

(52) U.S. Cl.
CPC ............ *G06F 9/453* (2018.02); *G06F 9/4446* (2013.01); *G06F 17/2881* (2013.01); *G06F 17/248* (2013.01)

(58) Field of Classification Search
CPC .............................. G06F 17/24; G06F 17/248
See application file for complete search history.

(56) References Cited

U.S. PATENT DOCUMENTS

| | | | | |
|---|---|---|---|---|
| 5,970,484 | A * | 10/1999 | Church | G06F 17/30253 |
| 7,337,172 | B2 * | 2/2008 | Shapiro | G06Q 30/02 |
| 8,006,261 | B1 * | 8/2011 | Haberman | G11B 27/031 |
| | | | | 725/32 |
| 9,430,498 | B2 * | 8/2016 | Drogobetski | G06F 17/30241 |
| 9,589,384 | B1 * | 3/2017 | Waggoner | G06T 13/40 |
| 2003/0167449 | A1 * | 9/2003 | Warren | G06F 17/3089 |
| | | | | 715/202 |
| 2007/0204211 | A1 * | 8/2007 | Paxson | G06F 17/2229 |
| | | | | 715/205 |
| 2007/0220426 | A1 * | 9/2007 | Mueller | G06Q 10/087 |
| | | | | 715/236 |

(Continued)

OTHER PUBLICATIONS

Cavazza, M. et al. (Jun. 3, 2005). "Dialogue Generation in Character-Based Interactive Storytelling," retrieved from the internet, <http://www.aaai.org/Papers/AIIDE/2005/AIIDE05-004.pdf> 7 pages.

(Continued)

*Primary Examiner* — Laurie A Ries
(74) *Attorney, Agent, or Firm* — Cole Schotz, P.C.

(57) ABSTRACT

A system, a method, and a computer program product for generating or preparing documents are disclosed. At least one processor in a computing system receives at least one parameter relating to a document. The processor generates at least one narrative based on the received parameter. It also generates at least one document mapping based on the generated narrative. The processor combines the generated mapping and the generated narrative to generate the document.

18 Claims, 11 Drawing Sheets

(56) References Cited

U.S. PATENT DOCUMENTS

| | | | |
|---|---|---|---|
| 2008/0235576 A1* | 9/2008 | Bringsjord | G06N 5/00 715/256 |
| 2013/0297997 A1* | 11/2013 | Stanley | G06F 17/24 715/202 |
| 2014/0281892 A1* | 9/2014 | Baldwin | G06F 17/2247 715/234 |
| 2014/0344679 A1* | 11/2014 | Larsen | G06F 17/248 715/256 |
| 2015/0050631 A1* | 2/2015 | Reynaldo | G09B 5/06 434/308 |
| 2015/0381937 A1* | 12/2015 | Adibowo | H04N 7/157 345/473 |
| 2016/0155067 A1* | 6/2016 | Dubnov | G06F 17/2785 706/12 |
| 2017/0132198 A1* | 5/2017 | Desai | G06F 3/16 |
| 2017/0142036 A1* | 5/2017 | Li | G06F 17/2765 |
| 2017/0199865 A1* | 7/2017 | Ciancio-Bunch | G06F 17/248 |

OTHER PUBLICATIONS

International Search Report dated Sep. 19, 2016, for PCT Application No. PCT/US2016/041864, filed Jul. 12, 2016, 2 pages.
Written Opinion dated Sep. 19, 2016, for PCT Application No. PCT/US2016/041864, filed Jul. 12, 2016, 4 pages.

* cited by examiner

FIG. 6b

My Project

Find a Moment | Create a Draft | Create a Map | Revise Your Lens | Build Your Essay | Focus Out Overview / Revise Magnets / Revise Pivots / Revise Glows

HIDE

Strategy 1: Revise your Magnet to put the reader in the action.

Example

Sample Original Magnet
I told my dad I wanted to quit football and be a ballerina.

Sample Revised Magnet
My father jumped out of this chair.

Your original Magnet: — 605

I convinced my friend to sign up for a 100 mile adventure race with me.

Your revised Magnet: — 609

After going through 5 pages of waivers, we looked at each other and hit submit together.

DOCUMENT PREPARATION PLATFORM

CROSS-REFERENCE TO RELATED APPLICATIONS

The present application claims priority to U.S. Provisional Patent Application No. 62/192,376 to Barash et al., filed Jul. 14, 2015, and entitled "Document Preparation Platform, and incorporates its disclosure herein by reference in its entirety.

TECHNICAL FIELD

The present disclosure relates generally to data processing and, in particular, to a document preparation platform.

BACKGROUND

In today's world, effective communication (whether written or oral) can be key to bringing thoughts, ideas, concepts, etc. to light, generating revenue for business, providing an ability to distinguish and/or select specific business, educational, social, political, economic, etc. positions from a plurality of available positions, etc. Typically, effective communication can be based on a skill of engaging storytelling, where the recipient of the communication is captivated by concepts presented by the deliverer of the communication. Some specific examples of such communications are college admission documents that are written by user seeking admission to colleges, universities, and/or other educational institutions. Others include scholarship documents, grant requests, reports, etc. These documents are typically a requirement of the admission process and can serve to significantly improve the student's chances of being admitted to the educational institution of his/her choice. Many users typically require assistance and/or guidance in writing such documents in order to improve their chances of being admitted.

However, conventional methodologies for guiding user how to write such documents are ineffective as they typically do not rely on user' personal characteristics, traits, passions, achievements, and/or other personal information that can make a college admissions document an effective tool in improving chances of admission. Thus, there is a need for a system and a method for assisting users (e.g., user) in preparation of documents (e.g., college admission documents).

SUMMARY

In some implementations, the current subject matter relates to a computer-implemented method for generating or preparing documents. The method can include receiving, by at least one processor in a computing system, at least one parameter relating to a document, generating, by the processor, at least one narrative based on the received parameter, generating, by the processor, at least one document mapping based on the generated narrative, and combining, by the processor, the generated mapping and the generated narrative to generate the document.

In some implementations, the current subject matter can include one or more of the following optional features. In some implementations, at least one parameter can include at least one of the following: a trait, a thought, an idea, a concept, a purpose, a substantive context of the document and any combination thereof. At least one narrative can include at least one of the following: an audio, a video, a text, a data, a metadata, a graphic and any combination thereof.

In some implementations, at least one mapping can include at least one of the following: at least one magnet component identifier, at least one pivot component identifier, at least one glow component identifier, and any combinations thereof. In some implementations, the method can include modifying at least one of the following: the generated map, the at least one magnet component identifier, the at least one pivot component identifier, the at least one glow component identifier.

In some implementations, the method can include receiving at least one modification to the document and generating, based on the received at least one modification, a modified document.

In some implementations, the document can be generated based on at least one of the following: at least one predetermined template and without a template.

In some implementations, the method can further include selecting at least one portion of the document, modifying the at least one selected portion of the document; and generating, based on the at least one modified selected portion of the document, a modified document.

In some implementations, the current subject matter relates to a process for generating a document. The method can include receiving at least one parameter relating to a document (e.g., the parameter can relate to a particular trait, thought, idea, concept, purpose, and/or any other parameter relating to the substantive context of the document), generating a narrative based on the received parameter (e.g., the narrative can be aural, visual, textual, etc. and/or can be transcribed based on the generated narrative), generating a document mapping based on the generated narrative (e.g., the mapping can include a magnet component identifier, a pivot component identifier, and a glow component identifier; the generated map and/or the magnet, pivot, glow components can be reviewed and/or revised by a user of the system and/or the system (manually and/or automatically)), and combining the generated mapping and the generated narrative to generate the document. The user of the system can also be given an option to review and revise the document, substitute portions of the document, receive feedback, etc. The above operations can be performed using at least one processor of at least one computing system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 6a-6f illustrate various exemplary user interfaces that can be generated by the system shown in FIG. 2 and presented to the user of system shown in FIG. 2, according to some implementations of the current subject matter.

DETAILED DESCRIPTION

In some implementations, the current subject matter relates to document preparation platform that can be used to for preparation of documents (e.g., college admission documents). In some implementations, the platform can use neuroscience of storytelling as part of its document preparation and can include one or more of the following phases during document preparation process: a planning phase, a preparation phase, and a feedback phase. Each of these phases is discussed in further detail below.

Figure 1:
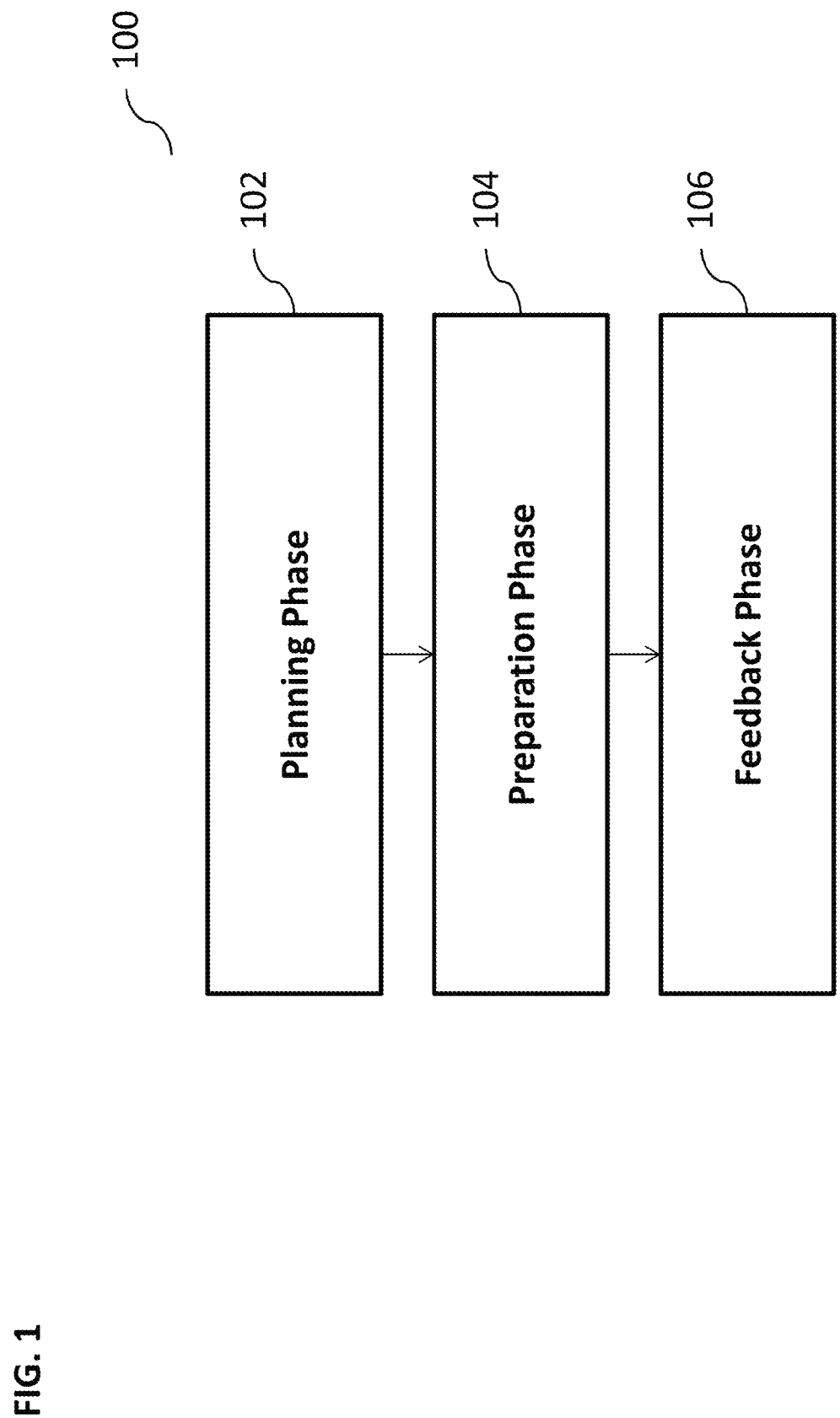
FIG. 1 illustrates an exemplary document preparation process, according to some implementations of the current subject matter.

FIG. 1 illustrates an exemplary document preparation process 100, according to some implementations of the current subject matter. At 102, the current subject matter's document preparation process can begin with a planning phase where a user of the process 100 can perform investigation and research. In some implementations, the user can be an individual, a computing system, a software application, and/or any other type of user and/or any combination thereof. The user can start the investigative process using a user interface, an application programming interface ("API"), and/or using any other means. The process 100 can be executed using a personal computer, a laptop, a cellular telephone, a smartphone, tablet computer, a personal digital assistant ("PDA"), and/or any other device and/or a plurality of devices. In some implementations, the devices can be communicatively coupled using a network (e.g., an Internet, an extranet, an intranet, a wide area network ("WAN"), a metropolitan area network ("MAN"), local area network ("LAN"), virtual network, and/or any other network and/or any combination thereof).

In some implementations, the investigation/research can be conducted using one or more databases. The user can select one or more database(s) and execute various queries on the selected databases. Alternatively, the database(s) can be pre-selected by the current subject matter system. The queries can be pre-written for the user and/or generated by the user. The information obtained from the searches of the databases can be saved to a dashboard. The dashboard can be a user interface that can be generated as a result of the executed queries and where results of the searches/executed queries can be processed, formatted, and displayed to the user in the user interface. In some implementations, where the searches/investigation relates to a college application/admission process, the dashboard can include requirements, deadlines, notes, etc. related to one or more colleges that the user (e.g., a high school student) can be applying to or interested in. The dashboard can also include an interactive communication component (e.g., an instant messaging capability, a video conference capability, etc.) that can allow the user to submit further queries, connect with other users, etc.

In some implementations, the user can manually perform such investigation/research. In alternate implementations, the current subject matter system can perform investigation/research automatically and/or semi-automatically upon receiving a query from the user (e.g., a query containing various keywords, parameters, etc. relating to the subject matter of the document the user wishes to prepare). For example, the user can be seeking an engineering degree, and in particular, a computer engineering degree, and interested in applying to colleges that have such programs and an internship opportunities at computer software companies. This information can be entered into the query and submitted to one or more database(s). The databases can include databases containing information about colleges, news organization databases, encyclopedia databases, and/or any other types of databases. In some implementations, the current subject matter can relate to a process of investigation/searching of various data (e.g., medical records, legal records, etc.) and the process 100 can be tailored to the specific records that are being searched.

In case of an exemplary, non-limiting case of where the user of the process 100 is a student seeking admission to a college, the student can research and/or select colleges to which the student is interested in applying to. This can be done through research of a database that can contain college information (e.g., college name, location, requirements, reputation, sciences and arts being studied, etc.). Once colleges are selected, the student can save them on a dashboard. The dashboard can include deadlines, prompts, requirements, etc. for all documents that a particular college may require. From here, the student can select any document prompt to move into the writing phase. The student can also choose to receive alerts about deadlines for colleges they have selected.

Referring back to FIG. 1, at 104, a preparation phase can be initiated. During this phase, a document can be prepared based on the information that has been investigated/researched as well as based on any other information submitted to the system (e.g., parameters, keywords, audio, video, text, social media, and/or any other information). The document can contain text, graphics, video, audio, hypertext transfer protocol ("HTTP") links, forms, templates, and/or any other information. It can provide a summary of the searched data/information and/or can identify data/information that may be of a particular interested. The document can be formatted in accordance with various preferences that can be determined by the user (e.g., the user would like to the document to be prepared in a power point presentation format, etc.). In some implementations, the current subject matter system can also include additional information/data that might not have been searched by the user, but as a result of the search criteria submitted by the user, the current subject matter system have determined to be relevant. This determination can be made based on analysis of keywords, search criteria, etc. and ascertaining whether other keywords, criteria contained in other data/information stored in the database can be relevant to the user's query.

In the exemplary, non-limiting scenario of the student applying to a college, the preparation phase can include creation of a narrative through use of a dynamic content as well as employing sequenced interactive exercises. The current subject matter system can implement at least one of the following stages during the preparation phase 104:
- identifying a moment;
- recording a story about that moment;
- transcribing a story to create a first draft;
- organizing the story using a three-sentence map;
- evaluating content that fits into the map; and
- replacing thoughts, interpretations, judgments, etc. with details, dialogue, description, etc.

Upon completion of the preparation phase 104, a narrative that is personal and insightful in nature can be generated. The narrative can be based on various best practices principles (e.g., Common Core State Standards, etc.) and can be judgment-free.

The next phase of the process 100 can include a feedback phase, at 106, as shown in FIG. 1. During this phase, the user can be provided with a feedback on the work product prepared during the preparation phase 104 and/or suggestions for any revisions. The suggestions/revisions can be received through the dashboard and/or through any other means.

Referring back to the exemplary, non-limiting scenario of the student preparing a college admissions essay, the feedback phase 104 can allow the student to receive written feedback and/or online coaching, suggestions, etc. The student can request support online through the dashboard. The feedback can be provided using a question-answer feedback, which can draw details from the student and keep the writing in the student's voice.

Figure 2:
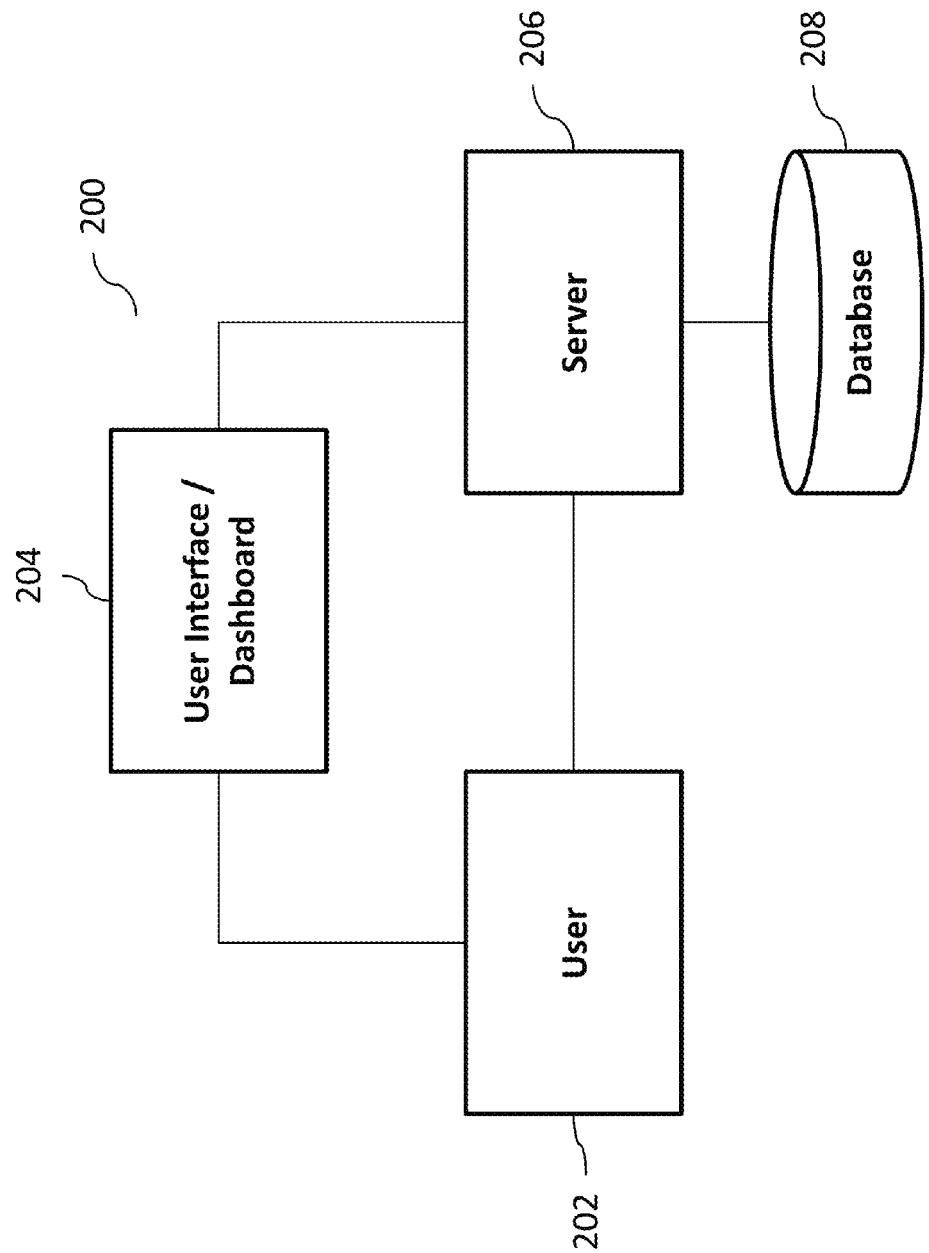
FIG. 2 illustrates an exemplary system for document preparation, according to some implementations of the current subject matter.

FIG. 2 illustrates an exemplary system 200 for document preparation, according to some implementations of the current subject matter. The system 200 can include a user 202 (e.g., a student applying for a college admission) communicating with a server 206, which can host and/or provide access to information that can be involved in the process 100, and a database 208. The user 202 can be similar to the user of the process 100 shown in FIG. 1. The database 208 can be one or more storage locations that can store a plurality of information, e.g., user's preferences, queries, search/investigation parameters, search/investigation results, draft of documents, feedback on the drafted documents, final documents, etc. The user 202 can access the database 208 upon generating a query, as discussed above. The user 202 can communicate with the server 206 and/or database 208 through use of a user interface/dashboard 204. Using the user interface/dashboard, the user 202 can enter queries, view results of queries, prepare documents, revise documents, view information related to a particular document being prepared (e.g., requirements of specific colleges, deadlines, etc.).

Figure 3:
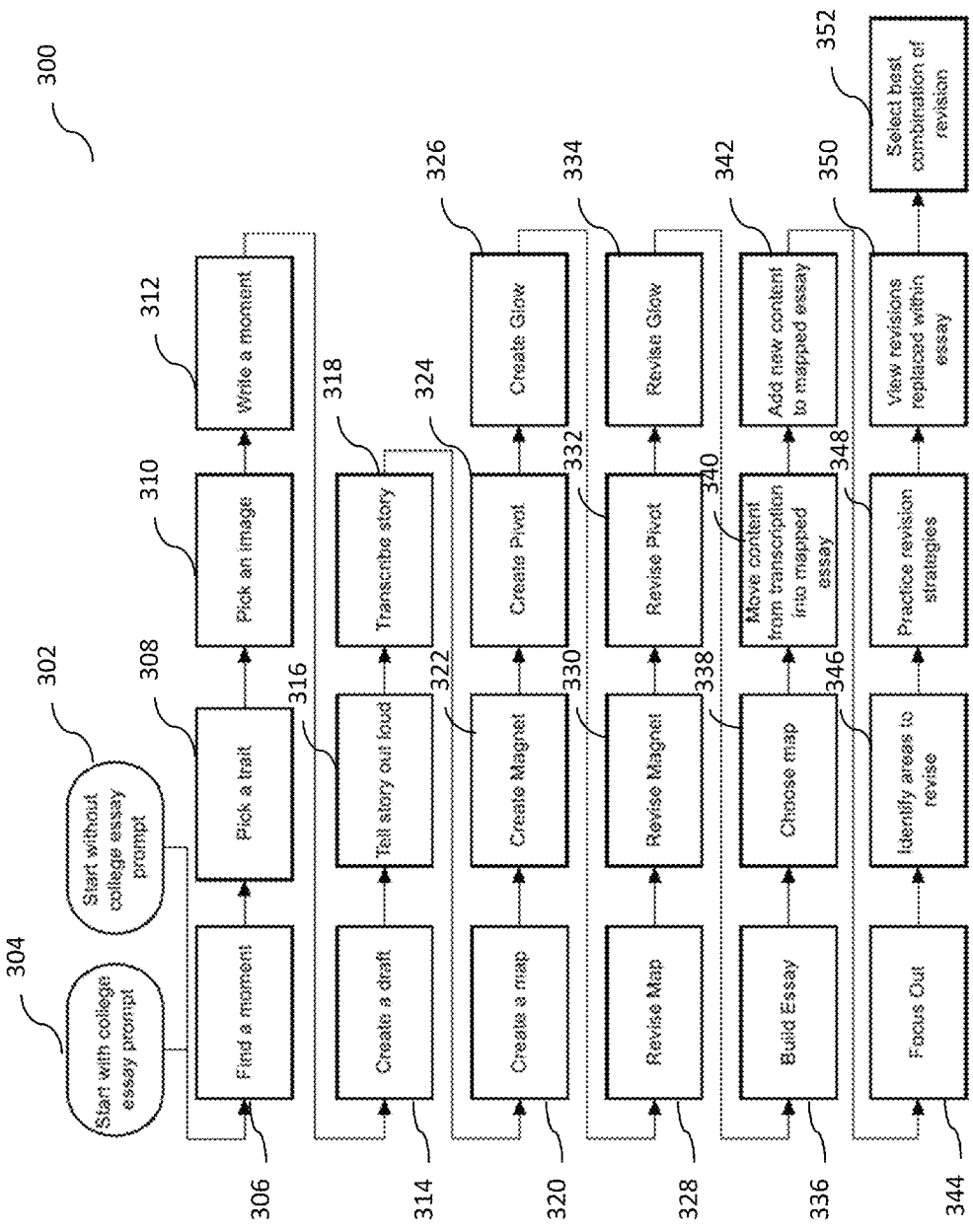
FIG. 3 illustrates an exemplary document preparation process, according to some implementations of the current subject matter.

FIG. 3 illustrates an exemplary document preparation process 300, according to some implementations of the current subject matter. The process 300 can be performed using system 200 and/or any other system. The following discussion of the process 300 is presented from a point of view of the user 202, which can be a student preparing an essay as part of a college admissions process. As can be understood by one having ordinary skill in the art, this process is applicable to preparation of any document for any purpose. The discussion below is not intended to limit the scope of the current subject matter and is presented by way of non-limiting, exemplary illustration.

As shown in FIG. 3, operations 302-334 can be included in the planning phase 102 of the process 100 shown in FIG. 1. Operations 336-352 can be included in the preparation phase 104 of the process 100. The feedback phase 106 can begin subsequent to the completion of operation 352.

A part of the planning phase 102, a document (e.g., a college essay) can be started with a prompt, at 302, or without a prompt, at 304. If the document is started with a prompt, at 302, a document type can be selected. Document prompts can be coded with a document type so that the content presented to the user 202 (e.g., student) in the user interface 204 can be specific to the type of document the user wishes to create. The following exemplary, non-limiting document types can be used: defining moment, influence, issue, community, why (e.g., why this college/major is/are selected), scholarship, extracurricular interest(s), academic interest(s), etc., and/or any combination thereof. The current subject matter can dynamically create document types and/or can be adapted to any type and/or length specifications of a document. If a document is to be created without a prompt, at 304, the user can be asked to self-identify what type of document he/she would like to prepare.

To find a moment, at 306, the user 202 (e.g., student) can begin by selecting a trait they want to explore. They can be presented with a plurality of traits that can be based on personality types (e.g., 16 based on the 16 different Myers-Briggs personality types). Once the user selected a trait, at 308, the user can be presented with a plurality of images (e.g., three) that can represent different ways that trait can be revealed through action. The user 202 can select an image, at 310, which can best represent how the user brings the trait to life. Then, the user 202 can be requested to identify a moment in user's own life when the user has shown this trait. The user 202 can be presented with example moments and guiding questions that can be dynamic based on the selected trait. The user 202 can then write about the moment in a predetermined number of characters (e.g., 140 characters), at 312.

At 314, a draft can be created. The user 202 can be prompted to tell the story about the selected moment, at 316. The current subject matter system can request the user 202 to record an audio and/or video recording (and/or any other type of recording). The recording can be generated through use of a camera (e.g., a webcam, a mobile recording device, etc.). The act of telling the story out loud can help the user 202 to get past the formulas that the user may have been taught on how to write to uncover details and access user's unique voice. The user 202 can review the recording, re-record, and/or save (e.g., in the database 208 as shown in FIG. 2). The recording device can be communicatively (e.g., wirelessly and/or wired) coupled with the user interface 204 and/or server 206.

Once the recording is completed, the recording can be transcribed to create a first draft, at 318. In some implementations, the user 202 can listen to the recording and transcribe it and/or the system can automatically transcribe the recording using a conventional voice recognition function. The transcription can be reviewed for any errors. In some implementations, the current subject matter system can do so automatically and/or manually, such as upon instructions from the user.

At 320, a map can be created. Once the transcription is completed, a map organizing user's story can be created (e.g., in three sentences). The map can be used to provide the story a sense of purpose and/or direction. The map can include a magnet component (e.g., the first sentence of the story that can draw the reader in and make the reader want to keep reading), at 322, a pivot component (e.g., the point in the story where the user risks something, learns something, grows, changes, takes action, etc.), at 324, and a glow component (e.g., the last sentence of the story that leaves something for the reader to remember and makes them want to know more about the student), at 326. The user 202 can be presented with definitions for magnet, pivot, and glow components as well as examples of how to look at a transcription and identify where such components exist. The user interface 204 can be used for such purposes. The user 202 can review the transcription of the story and identify such magnet, pivot, and glow components, at 322-326.

Once the user 202 has created the magnet, pivot, and glow components, the user can be requested to review and revise the generated map, at 328. Based on the generated map, the user 202 can be presented with various revision strategies for the magnet, pivot, and glow components. As part of the revision strategies, the user 202 can be presented with definitions, examples, etc. of each component and can be requested to use a particular strategy to revise the originally created magnet, pivot, and glow components, at 330-334, respectively. The user 202 may or may not wish to revise the originally generated magnet, pivot, and glow components, if, for example, the user is or is not satisfied with the original ones.

In some implementations, one or more maps can be created using one or more different or the same magnets, pivots, and/or glow components. The map and components can be represented using various computer code and/or data stored in one or more database(s) (e.g., database 208 shown in FIG. 2). The server 206 can be used to link and/or combine the components into one or more map(s) for presentation to the user via the dashboard 204. The map(s) and/or component(s) can be stored in the database 208.

Upon finalization of the magnet, pivot, and glow components, the user 202 can begin to build or prepare the document (e.g., essay), at 336. This can constitute a beginning of the preparation phase 104, as shown in FIG. 1. The user 202 can view all maps, magnet, pivot, and glow components that the user has generated as well as other information that the user has entered into the system. Then, the user 202 can select different combinations of magnet, pivot, and glow components and then can view the map to see how such combinations work together, at 338. The user 202 can select the best map that is suitable to the user.

Once the map has been selected, the map can be displayed on the dashboard 204 along with the transcription of the story. The user 202 can move content from the transcription into the mapped documents, e.g., by dragging and dropping sentences into the selected map, at 340. After the content is moved into the mapped document, the user 202 can rearrange the content as desired (e.g., move content around using drag and drop functionality and/or edit sentences and/or add additional content, etc.), at 342.

At 344, the user 202 can focus out by reviewing places in the prepared document where the user's writing includes thoughts, interpretations, judgments, emotions, etc. and can choose to replace them with details, dialogue, description, etc., at 346. The current subject matter system can allow the user 202 to view the mapped document that has been created and highlight various trigger words (e.g., words that can indicate that revision is necessary, such as, "I thought," "I felt," "I realized", etc.) to request user's attention to those areas and indicate that revision may be necessary in those areas of the document. In some implementations, the trigger words can be highlighted in different colors, a pop-up can be generated, and/or the user can be alerted in any other fashion. The user 202 can select a sentence from the created document and the current subject matter system (e.g., using an "areas to focus out" section of the user interface 204 (not shown in FIG. 2)) can allow the user 202 to select at least one revision strategy, at 348, and provide examples of revisions so that the user can perform revision of a particular phrase. In some implementations, the system 200 can generate various revision options for the user 202. After the user 202 generated the various possible revisions to the identified areas, the user can view the revised document with the various possible revisions and/or combinations of revisions, at 350. The user 202 can also select different combinations of the revisions and see for inclusion into the document. This can allow the user 202 to quickly view a plurality of different document versions without copying, pasting, rewriting, and/or saving different versions. Once the user 202 selected the combination of revisions that works best for the user, at 352, the writing phase 104 can be completed. The user 202 can have the option to receive feedback in the feedback phase 106 (e.g., from a third party). The user 202 can save the document to the dashboard (manually and/or automatically). The user 202 can also download/upload the created document to any application and/or storage location (e.g., it can be automatically submitted to the college's admission office).

Figure 6A:
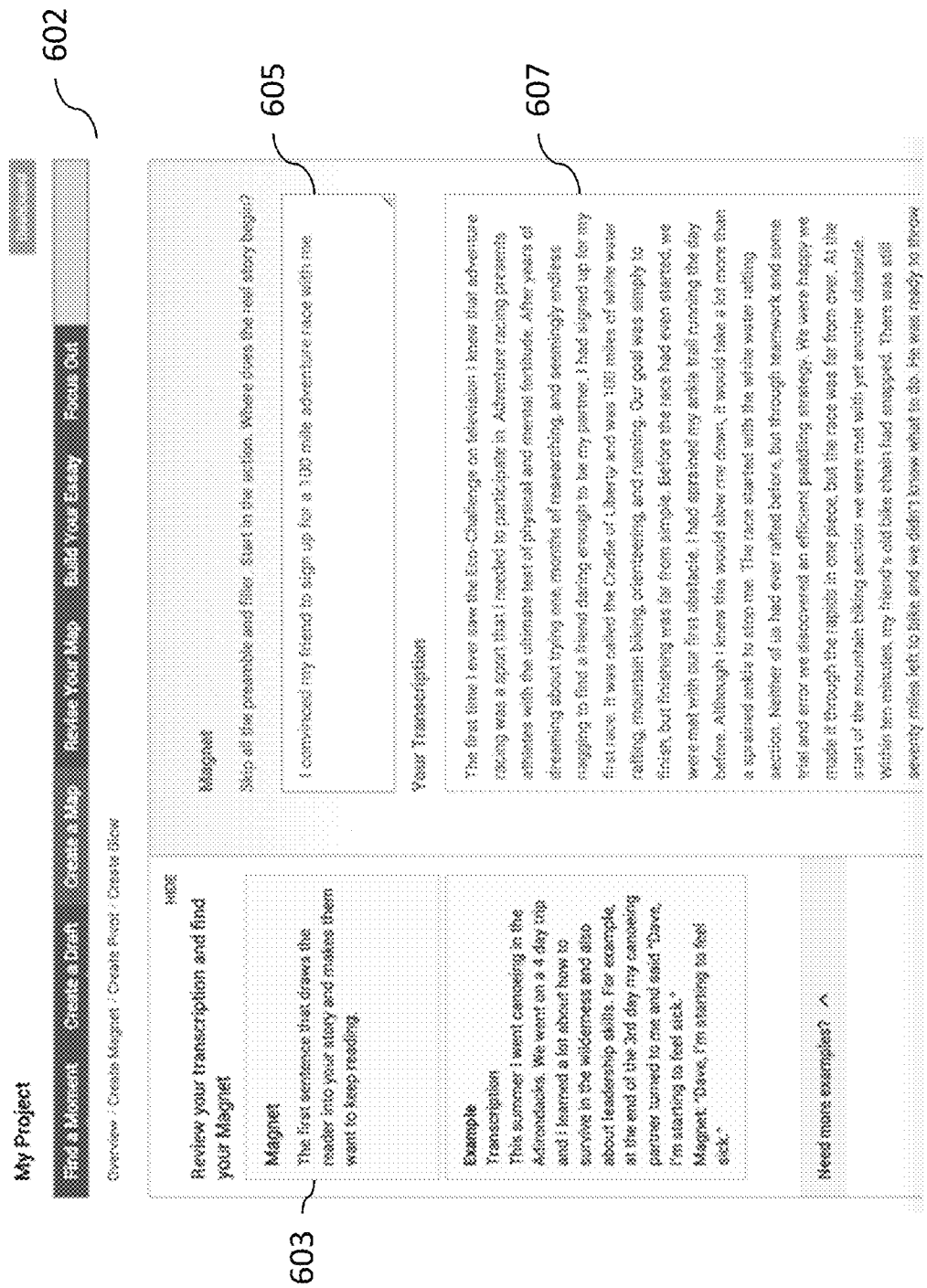

FIGS. 6a-6f illustrate various exemplary user interfaces that can be generated by the system 200 (shown in FIG. 2) and presented to the user 202 using the user interface component 204 during the process 100 shown in FIG. 1. For example, FIG. 6a illustrates an exemplary user interface 602 that can be used for creation of a magnet. The user interface 602 can be generated by the system 200 as a result of the user wishing to create a document (e.g., a college essay, and/or any other document). The user interface 602 can include a graphical component 603 defining a magnet (e.g., "The first sentence that draws the reader into your story and makes them want to keep reading."). The user interface 602 can also include a magnet graphical component 605 that has been created as a result of various information that has been entered. The user interface 602 can also include a transcription 607 that can contain a narrative related to the magnet.

FIG. 6b illustrates an exemplary user interface that can allow revision of the created magnet. The original magnet 605 can be changed into a revised magnet 609. The revision can be performed manually and/or automatically by the current subject matter system. The system can also provide suggestions to the user for revising the original magnet component 605. The revised magnet 609 can be saved and/or discarded. Similar processes can be performed for creation and/or revision of pivots and/or glows.

Figure 6C:
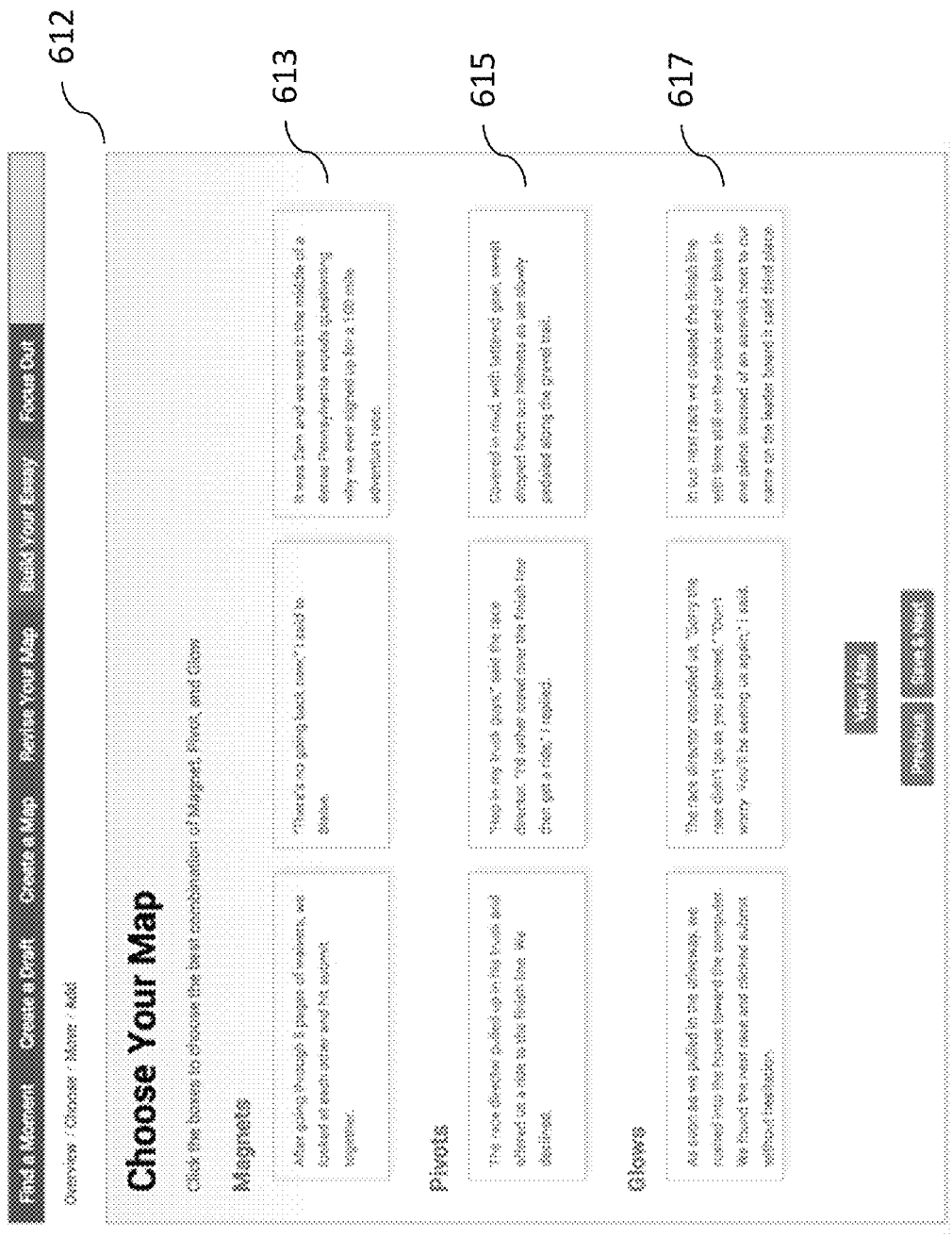

FIG. 6c illustrates an exemplary user interface 612 that allows the user to view various map options. The user can select various magnet components 613, pivot components 615, and/or glow components 617. The components 613-617 can be created and/or revised based on the input received from the user and/or from the system. The user interface 612 can allow selection of the one or more components 613-617 for generation of the map and the eventual essay.

Figure 6D:
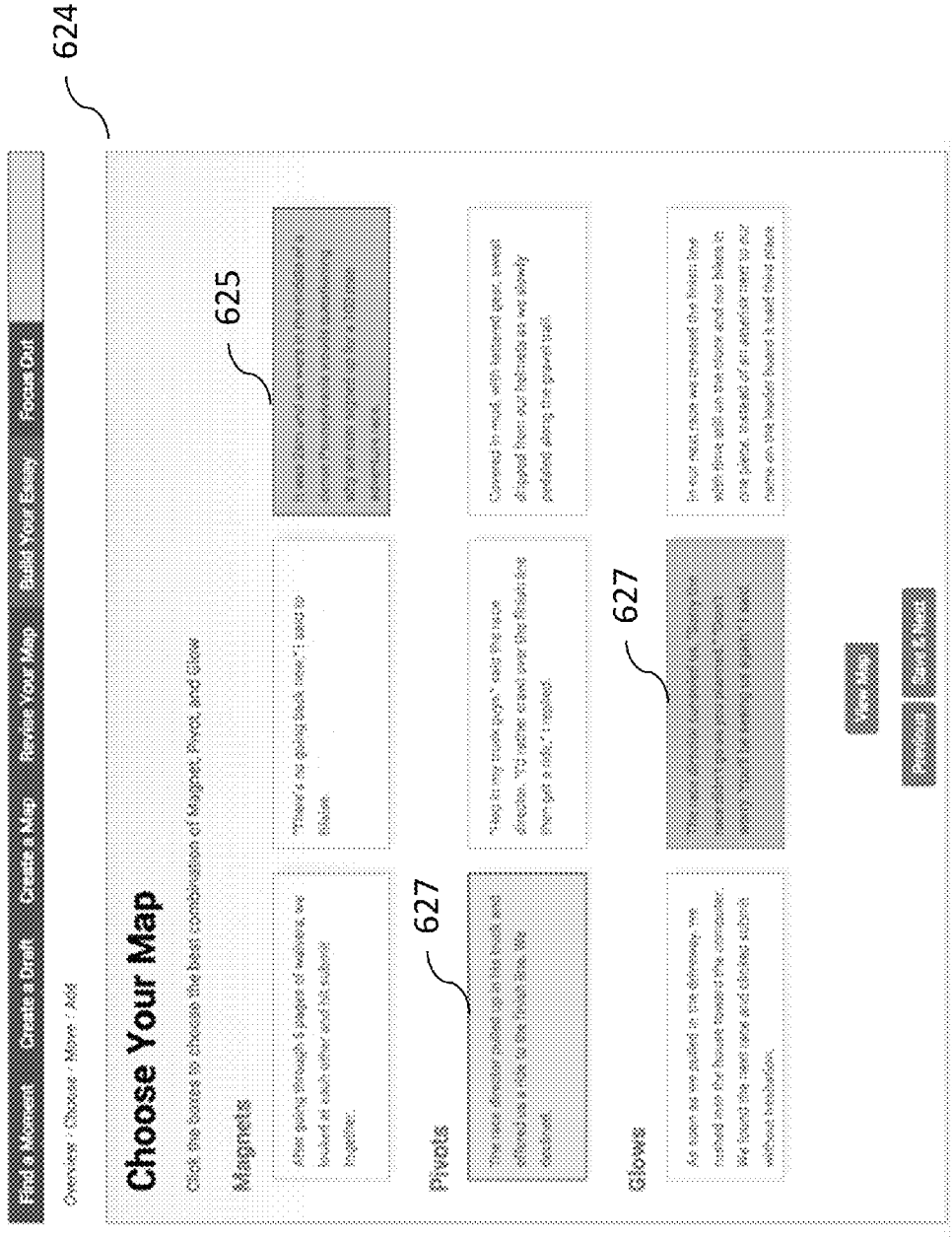

FIG. 6d illustrates an exemplary user interface 624 that can allow selection of one or more map options from a plurality of map options (selected map options can be highlighted on the user interface). As shown in FIG. 6*d*, a magnet component 625, a pivot component 627, and a glows component 629 have been selected for the purposes of a map of the document. Subsequent to the selection, the user can view the map and/or change the components if desired. Once the selections are accepted, the user can save the map and the selected components.

Figure 6E:
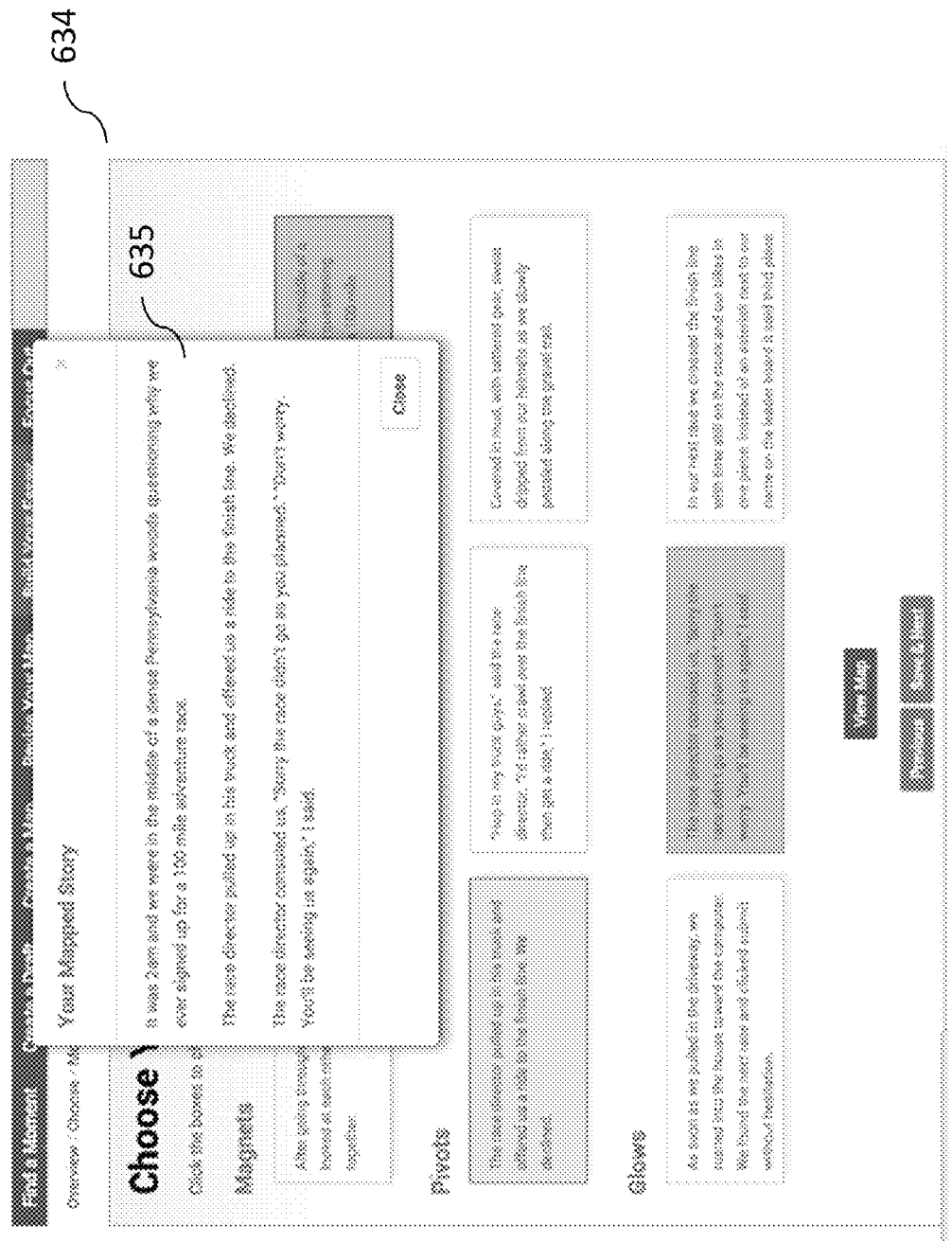

FIG. 6*e* illustrates an exemplary user interface 634 that can allow the user 202 to view user's mapped essay. The user interface 634 can include a graphical pop-up component 635 that can illustrate user's selected components 625-629 that have been selected in the user interface 624 (as shown in FIG. 6*d*).

Figure 6F:
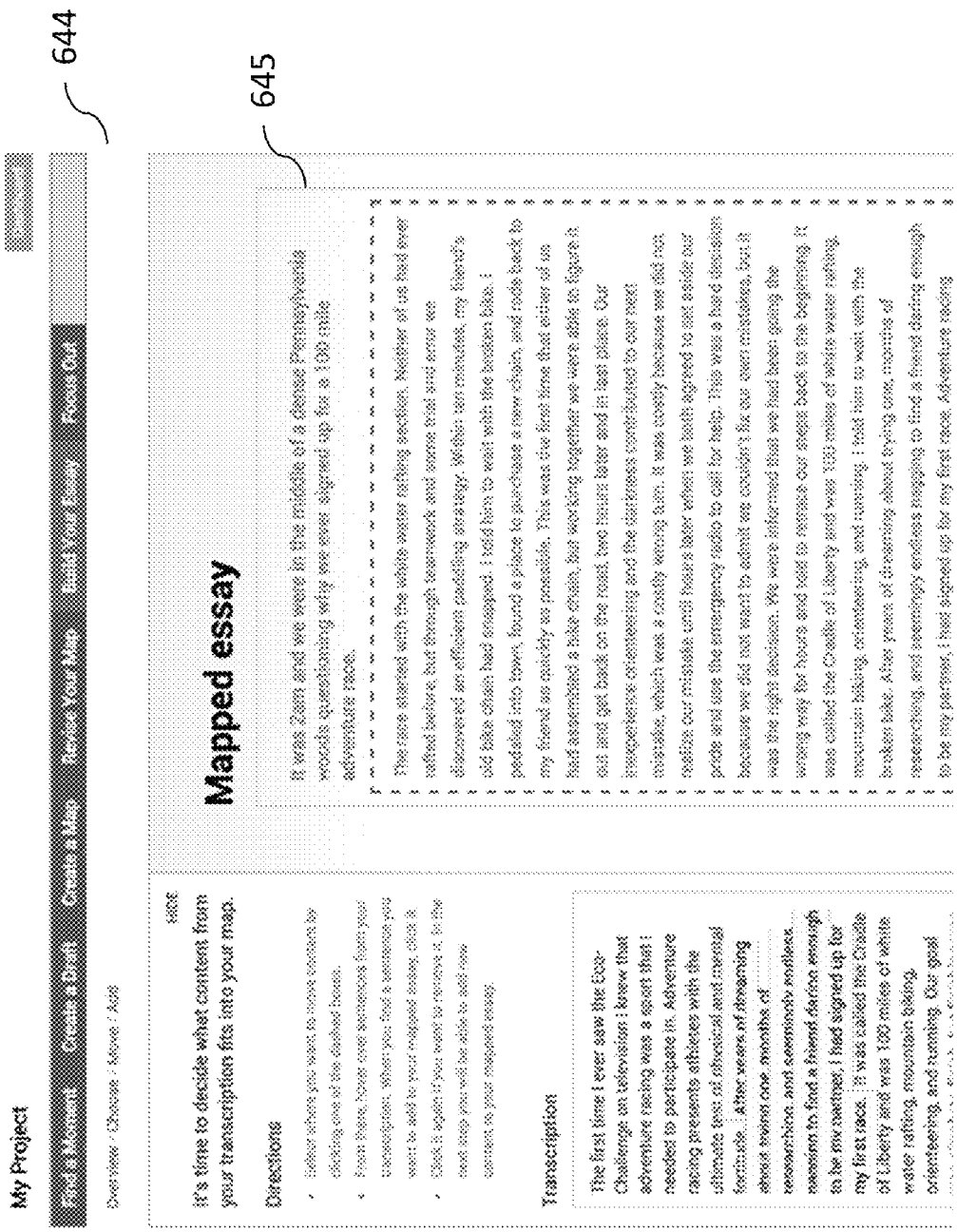

FIG. 6*f* illustrates an exemplary user interface 644 that can allow the user 202 to move content into a map, e.g., a map that has been selected by the user 202 using user interfaces shown in FIGS. 6*a*-6*d*. The user interface 644 can include a mapped essay window 645 that has been generated based on the selected component 625-629.

The current subject matter is not limited to the shown user interfaces, which are provided for illustrative, non-limiting purposes only. Different user interfaces and/or more user interfaces can be generated as part of the process 100.

In some implementations, the current subject matter system can operate on software-as-a-service ("SaaS") model. The SaaS model can be a software licensing and/or delivery model, whereby software can be licensed based on a subscription and/or centrally hosted in a cloud by independent software vendors and/or application service providers. SaaS can be accessed by users using a thin client via a web browser. SaaS can be a delivery model for business applications, which can include office and messaging software, database management software, customer relationship management ("CRM"), management information systems ("MIS"), enterprise resource planning ("ERP"), invoicing, human resource management ("HRM"), content management ("CM"), service desk management, etc. It can implement and/or require various communication capabilities as well as subscription for revenue generation purposes. In some implementations, the current subject matter can include a subscription component, whereby users are prompted to provide payment prior to use of the software. The fee can be fixed and/or based on a specific pricing structure.

Figure 4:
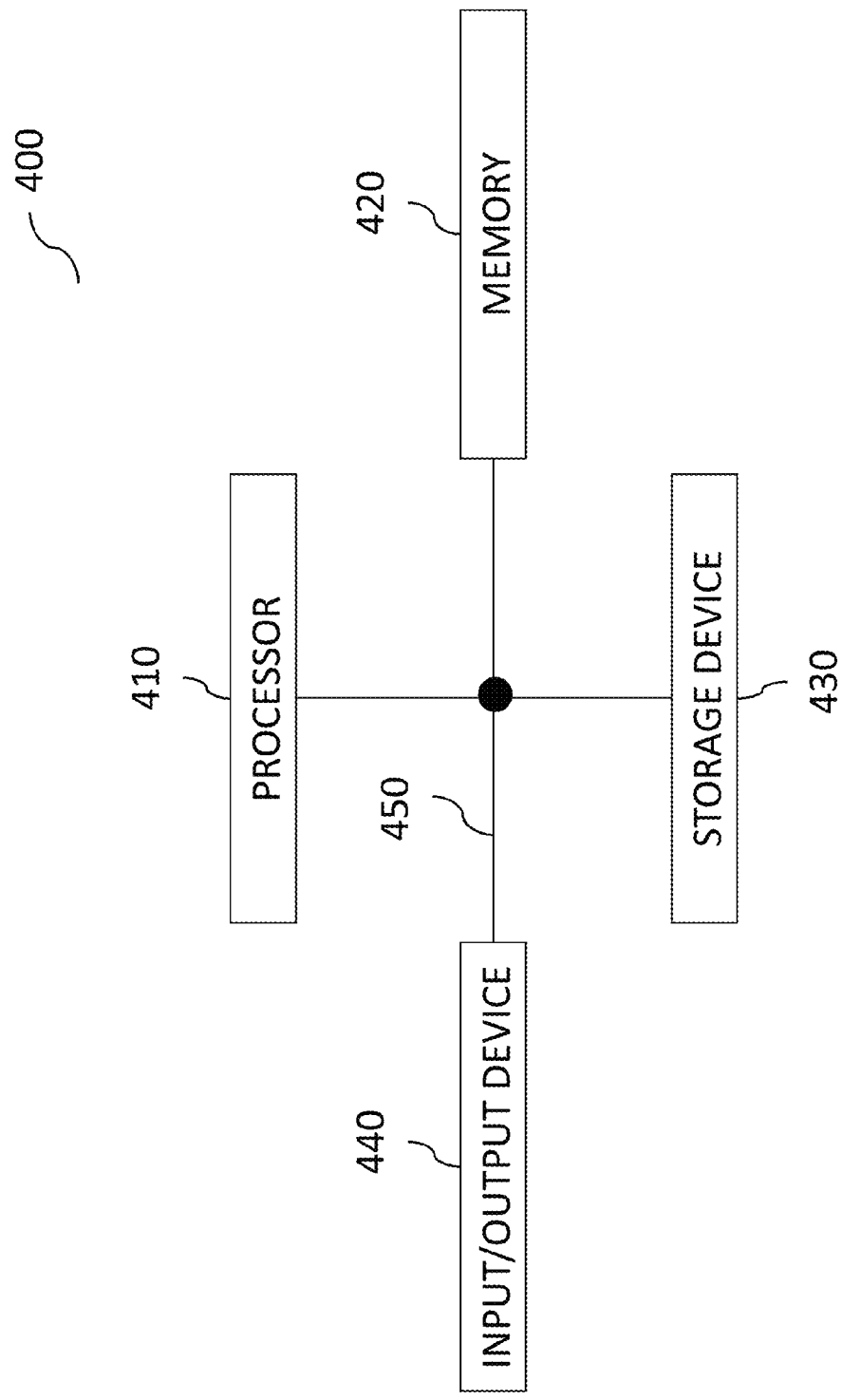
FIG. 4 illustrates an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
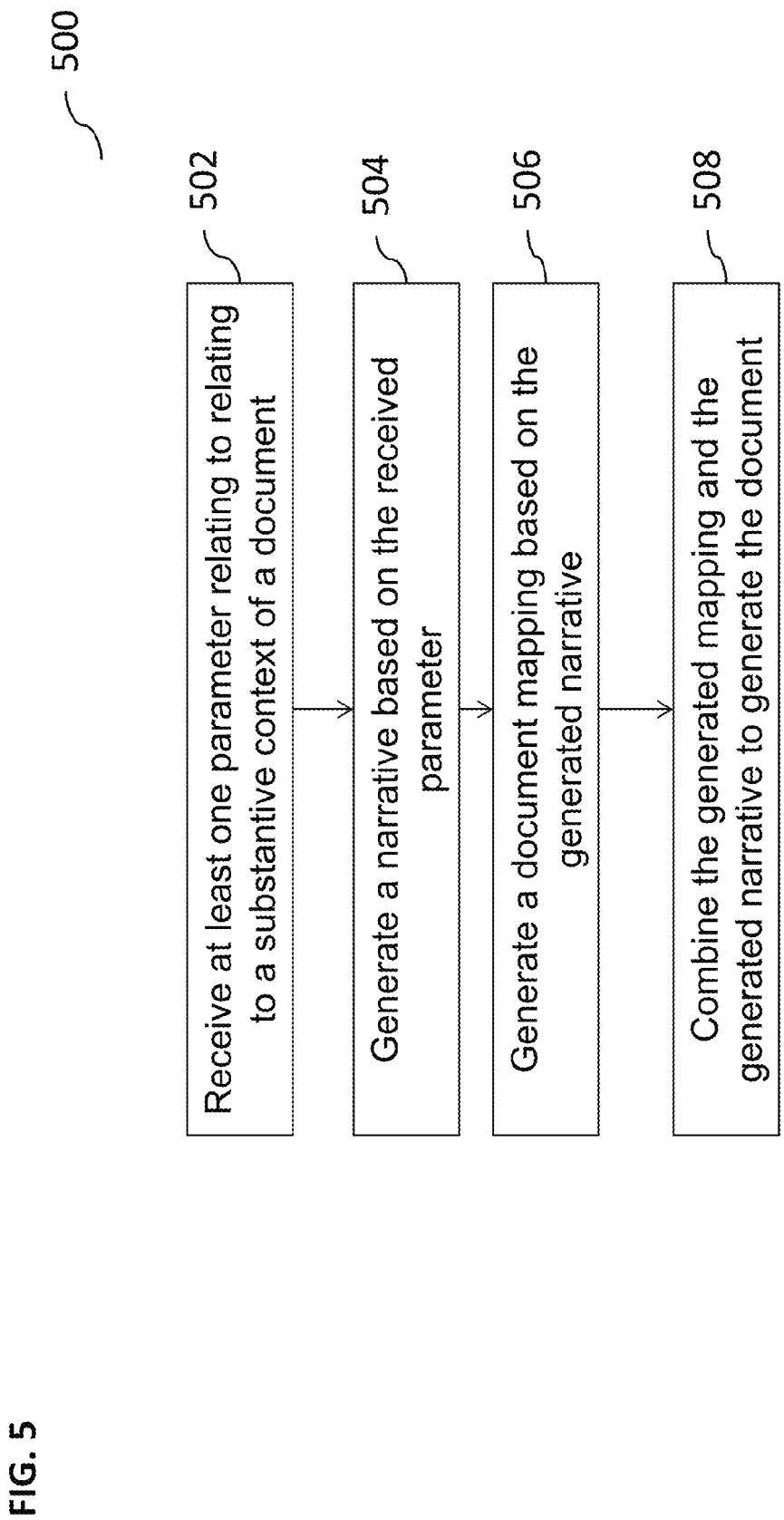
FIG. 5 illustrates an exemplary method, according to some implementations of the current subject matter.

FIG. 5 illustrates an exemplary method 500 for generating of a document, according to some implementations of the current subject matter. At 502, at least one parameter relating to a document can be received by the system. The parameter can relate to a particular trait, thought, idea, concept, purpose, and/or any other parameter relating to the substantive context of the document. At 504, a narrative is generated based on the received parameter. The narrative can be aural, visual, textual, etc. and/or can be transcribed based on the generated narrative. At 506, a document mapping can be generated based on the generated narrative. The mapping can include a magnet component identifier, a pivot component identifier, and a glow component identifier. In some implementations, the generated map and/or the magnet, pivot, glow components can be reviewed and/or revised by the user 202 (as shown in FIG. 2) and/or the system 200 (manually and/or automatically). At 508, the generated mapping and the generated narrative can be combined to generate a document. The user 202 can also be given an option to review and revise the document, substitute portions of the document, receive feedback, etc.

In some implementations, the current subject matter can include one or more of the following optional features. In some implementations, at least one parameter can include at least one of the following: a trait, a thought, an idea, a concept, a purpose, a substantive context of the document and any combination thereof. At least one narrative can include at least one of the following: an audio, a video, a text, a data, a metadata, a graphic and any combination thereof.

In some implementations, at least one mapping can include at least one of the following: at least one magnet component identifier, at least one pivot component identifier, at least one glow component identifier, and any combinations thereof. In some implementations, the method can include modifying at least one of the following: the generated map, the at least one magnet component identifier, the at least one pivot component identifier, the at least one glow component identifier.

In some implementations, the method can include receiving at least one modification to the document and generating, based on the received at least one modification, a modified document.

In some implementations, the document can be generated based on at least one of the following: at least one predetermined template and without a template.

In some implementations, the method can further include selecting at least one portion of the document, modifying the at least one selected portion of the document; and generating, based on the at least one modified selected portion of the document, a modified document.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, by at least one processor in a computing system, at least one parameter relating to a document;
generating, by the at least one processor, at least one narrative based on the received parameter;
generating, by the at least one processor, at least one document mapping based on the at least one generated narrative;
wherein the at least one document mapping includes:
(i) a plurality of magnet component identifiers, (ii) a plurality of pivot component identifiers, and
(iii) a plurality of glow component identifiers;
displaying to a user, by the at least one processor, the plurality of magnet component identifiers, the plurality of pivot component identifiers, and the plurality of glow component identifiers;
receiving from the user, by the at least one processor, a selected magnet component identifier from the plurality of magnet component identifiers;
receiving from the user, by the at least one processor, a selected pivot component identifier from the plurality of pivot component identifiers;
receiving from the user, by the at least one processor, a selected glow component identifier from the plurality of glow component identifiers;
generating, by the at least one processor, a user-selected map based on the selected magnet component identifier, the selected pivot component identifier, and the selected glow component identifier;
and
combining, by the at least one processor, the user-selected map and the at least one generated narrative to generate the document.

2. The method according to claim 1, wherein the at least one parameter includes at least one of the following: a trait, a thought, an idea, a concept, a purpose, a substantive context of the document and any combination thereof.

3. The method according to claim 1, wherein the at least one narrative includes at least one of the following: an audio, a video, a text, a data, a metadata, a graphic and any combination thereof.

4. The method according to claim 1, further comprising receiving at least one modification to the document; and generating, based on the received at least one modification, a modified document.

5. The method according to claim 1, wherein the document is generated based on at least one of the following: at least one predetermined template and without a template.

6. The method according to claim 1, further comprising:
selecting at least one portion of the document;
modifying the at least one selected portion of the document; and
generating, based on the at least one modified selected portion of the document, a modified document.

7. A system comprising:
at least one programmable processor; and
a machine-readable medium storing instructions that, when executed by the at least one programmable processor, cause the at least one programmable processor to perform operations comprising:
receiving at least one parameter relating to a document;
generating at least one narrative based on the received parameter;
generating at least one document mapping based on the at least one generated narrative;
wherein the at least one document mapping includes:
(i) a plurality of magnet component identifiers,
(ii) a plurality of pivot component identifiers, and
(iii) a plurality of glow component identifiers;
displaying to a user the plurality of magnet component identifiers, the plurality of pivot component identifiers, and the plurality of glow component identifiers;
receiving from the user a selected magnet component identifier from the plurality of magnet component identifiers;
receiving from the user a selected pivot component identifier from the plurality of pivot component identifiers;
receiving from the user a selected glow component identifier from the plurality of glow component identifiers;
generating a user-selected map based on the selected magnet component identifier, the selected pivot component identifier, and the selected glow component identifier;
and
combining the user-selected map and the at least one generated narrative to generate the document.

8. The system according to claim 7, wherein the at least one parameter includes at least one of the following: a trait, a thought, an idea, a concept, a purpose, a substantive context of the document and any combination thereof.

9. The system according to claim 7, wherein the at least one narrative includes at least one of the following: an audio, a video, a text, a data, a metadata, a graphic and any combination thereof.

10. The system according to claim 7, wherein the operations further comprise
receiving at least one modification to the document; and
generating, based on the received at least one modification, a modified document.

11. The system according to claim 7, wherein the document is generated based on at least one of the following: at least one predetermined template and without a template.

12. The system according to claim 7, wherein the operations further comprise selecting at least one portion of the document;
modifying the at least one selected portion of the document; and
generating, based on the at least one modified selected portion of the document, a modified document.

13. A computer program product comprising a non-transitory machine-readable medium storing instructions that, when executed by at least one programmable processor, cause the at least one programmable processor to perform operations comprising:
receiving at least one parameter relating to a document;
generating at least one narrative based on the received parameter;
generating at least one document mapping based on the at least one generated narrative;
wherein the at least one document mapping includes:
(i) a plurality of magnet component identifiers,
(ii) a plurality of pivot component identifiers, and
(iii) a plurality of glow component identifiers;
displaying to a user the plurality of magnet component identifiers, the plurality of pivot component identifiers, and the plurality of glow component identifiers;
receiving from the user a selected magnet component identifier from the plurality of magnet component identifiers;
receiving from the user a selected pivot component identifier from the plurality of pivot component identifiers;
receiving from the user a selected glow component identifier from the plurality of glow component identifiers;
generating a user-selected map based on the selected magnet component identifier, the selected pivot component identifier, and the selected glow component identifier;
and
combining the user-selected map and the at least one generated narrative to generate the document.

14. The computer program product according to claim 13, wherein the at least one parameter includes at least one of the following: a trait, a thought, an idea, a concept, a purpose, a substantive context of the document and any combination thereof.

15. The computer program product according to claim 13, wherein the at least one narrative includes at least one of the following: an audio, a video, a text, a data, a metadata, a graphic and any combination thereof.

16. The computer program product according to claim 13, wherein the operations further comprise
  receiving at least one modification to the document; and
  generating, based on the received at least one modification, a modified document.

17. The computer program product according to claim 13, wherein the document is generated based on at least one of the following: at least one predetermined template and without a template.

18. The computer program product according to claim 13, wherein the operations further comprise
  selecting at least one portion of the document;
  modifying the at least one selected portion of the document; and
  generating, based on the at least one modified selected portion of the document, a modified document.

\* \* \* \* \*